(12) United States Patent
Fairman

(10) Patent No.: US 11,441,487 B2
(45) Date of Patent: Sep. 13, 2022

(54) TURBOMACHINE WITH INTERNAL BEARING AND ROTOR-SPLINE INTERFACE COOLING AND SYSTEMS INCORPORATING THE SAME

(71) Applicant: Concepts NREC, LLC, White River Junction, VT (US)

(72) Inventor: Kevin D. Fairman, Lowell, MA (US)

(73) Assignee: Concepts NREC, LLC, White River Junction, VT (US)

(*) Notice: Subject to any disclaimer, the term of this patent is extended or adjusted under 35 U.S.C. 154(b) by 462 days.

(21) Appl. No.: 16/397,707

(22) Filed: Apr. 29, 2019

(65) Prior Publication Data

US 2019/0331027 A1 Oct. 31, 2019

Related U.S. Application Data

(60) Provisional application No. 62/663,657, filed on Apr. 27, 2018.

(51) Int. Cl.

| | |
|---|---|
| *F04D 29/58* | (2006.01) |
| *F02C 7/28* | (2006.01) |
| *F16C 33/74* | (2006.01) |
| *F02C 9/28* | (2006.01) |
| *F01D 11/02* | (2006.01) |
| *F01D 25/12* | (2006.01) |
| *F16C 32/04* | (2006.01) |

(52) U.S. Cl.
CPC ............. *F02C 7/28* (2013.01); *F01D 11/02* (2013.01); *F01D 25/125* (2013.01); *F02C 9/28* (2013.01); *F16C 33/746* (2013.01); *F05D 2240/51* (2013.01); *F16C 32/0406* (2013.01)

(58) Field of Classification Search
None
See application file for complete search history.

(56) References Cited

U.S. PATENT DOCUMENTS

| | | |
|---|---|---|
| 5,137,284 A | 8/1992 | Holder |
| 5,370,403 A | 12/1994 | Sedy |
| 5,412,977 A * | 5/1995 | Schmohl .............. F16J 15/3404 73/46 |
| 6,050,727 A | 4/2000 | Messmer et al. |

(Continued)

FOREIGN PATENT DOCUMENTS

CN 101915607 B 12/2010

OTHER PUBLICATIONS

Malcolm Leader, P.E., "Rotordynamics of semi-rigid and overhung turbomachinery" Apr. 15, 2018, Applied Machinery Dynamics Co. (Year: 2018).*

(Continued)

*Primary Examiner* — Kayla McCaffrey
(74) *Attorney, Agent, or Firm* — Downs Rachlin Martin PLLC

(57) ABSTRACT

Aspects of the present disclosure include turbomachines designed and configured for high temperature and pressure operation and increased power level output that minimize pressure vessel design requirements, and increase dry gas seal reliability. In some examples, a first radial bearing is located in a high temperature and/or pressure region of the turbomachine between a rotor of the machine and a dry gas seal while other bearings are located outside of the high pressure region.

14 Claims, 7 Drawing Sheets

(56) References Cited

U.S. PATENT DOCUMENTS

| | | | |
|---|---|---|---|
| 7,352,553 B2 | 4/2008 | Kozaki et al. | |
| 7,644,572 B2 | 1/2010 | Labala | |
| 8,485,531 B2 | 7/2013 | Durling | |
| 8,893,499 B2* | 11/2014 | Maier | F02G 1/00 60/647 |
| 9,039,349 B2 | 5/2015 | Demetri et al. | |
| 9,441,668 B2 | 9/2016 | Devitt | |
| 9,476,428 B2 | 10/2016 | Agrawal et al. | |
| 9,617,167 B2 | 4/2017 | Kamen et al. | |
| 10,233,936 B2 | 3/2019 | Daguin et al. | |
| 2010/0135769 A1* | 6/2010 | Kleynhans | F04D 29/162 415/58.4 |
| 2014/0150449 A1* | 6/2014 | Watson | F01D 5/026 60/785 |
| 2014/0190172 A1* | 7/2014 | Maier | F02C 3/04 60/772 |
| 2015/0037136 A1* | 2/2015 | Fairman | F16C 32/0474 415/68 |
| 2015/0330261 A1 | 11/2015 | Held | |
| 2017/0184130 A1 | 6/2017 | Bertoneri | |
| 2017/0191486 A1 | 7/2017 | Alfes | |
| 2017/0370471 A1 | 12/2017 | Martin | |
| 2018/0223869 A1* | 8/2018 | Dozzini | F01D 15/00 |
| 2018/0298775 A1 | 10/2018 | Suter et al. | |
| 2019/0003481 A1 | 1/2019 | Baldassarre et al. | |
| 2019/0063257 A1* | 2/2019 | Fioravanti | F01D 15/005 |

OTHER PUBLICATIONS

Stahley, "Design, Operation, And Maintenance Considerations For Improved Dry Gas Seal Reliability In Centrifugal Compressors," Tutorial pp. 203-208 (2001) https://oaktrust.library.tamu.edu/bitstream/handle/1969.1/163334/t30pg203.pdf?sequence=1.

* cited by examiner

TURBOMACHINE WITH INTERNAL BEARING AND ROTOR-SPLINE INTERFACE COOLING AND SYSTEMS INCORPORATING THE SAME

RELATED APPLICATION DATA

This application claims the benefit of priority of U.S. Provisional Patent Application Ser. No. 62/663,657, filed Apr. 27, 2018, and titled Cantilevered/Overhung Turbine Configuration Using Magnetic Bearings in High Temperature and Super-critical CO2 Turbomachinery Applications, which is incorporated by reference herein in its entirety.

STATEMENT REGARDING FEDERALLY SPONSORED RESEARCH OR DEVELOPMENT

This invention was made with government support under contract number DE-SC0017776 awarded by the U.S. Department of Energy. The government has certain rights in the invention.

FIELD OF THE INVENTION

The present invention generally relates to the field of turbomachinery. In particular, the present invention is directed to turbomachines with internal bearings and rotor-spline interface cooling and systems incorporating the same.

BACKGROUND

There is a desire to increase the temperature and/or pressure of thermodynamic cycles to increase thermal efficiencies and/or minimize machinery size. Supercritical power cycles such as supercritical carbon dioxide (sCO2) power cycles, are an example of high temperature and pressure cycles. sCO2 power cycles are attractive because of the very high thermal efficiencies, e.g., around 45%, that can be achieved. sCO2 is also of interest for various applications because of its special properties as a supercritical fluid and for its non-toxicity. For example, sCO2 is used to produce micro- and nano-scale particles, as a solvent for dry-cleaning, for enhanced oil recovery, as a foaming agent in polymers and in supercritical fluid extraction processes, such as decaffeinating coffee beans, extracting hops for beer production and extracting essential oils from plants.

Increasing temperatures, however, poses challenges for sensitive gas seals that are typically used to seal turbomachinery. And very high pressures can lead to increased working fluid densities, which can result in higher fluid forces on the impeller and increased impeller-casing force interactions, which pose challenges for rotordynamic stability.

SUMMARY OF THE DISCLOSURE

In one implementation, the present disclosure is directed to a turbomachine. The turbomachine includes a shaft; a rotor, a first bearing, at least one second bearing, and a dry gas seal, each of the rotor, first bearing, at least one second bearing and dry gas seal being operably coupled to the shaft; wherein the dry gas seal defines a pressure boundary between a high pressure region and a low pressure region of the turbomachine, the first bearing located between the rotor and the dry gas seal in the high pressure region and the at least one second bearing located in the low pressure region.

In another implementation, the present disclosure is directed to a turbomachine. The turbomachine includes a shaft; a rotor coupled to the shaft at an interface; a gas seal coupled to the shaft; and a coolant flow path configured to route a cooling fluid through the interface to cool the rotor and shaft.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Aspects of the present disclosure include turbomachines designed and configured for high temperature and pressure operation and increased power level output that minimize pressure vessel design requirements and increase dry gas seal reliability. In some examples, a first radial bearing is located in a high temperature and/or pressure region of the turbomachine between a rotor of the machine and a dry gas seal while other bearings are located outside of the high pressure region. In some examples, the turbomachines may include a coolant flow path that routes cooling fluid through an interface between the rotor and shaft to enable high temperature operation and prevent thermal soaking of the shaft and resulting failure of components coupled to the shaft due to exceeding maximum temperature limits.

Figure 1:
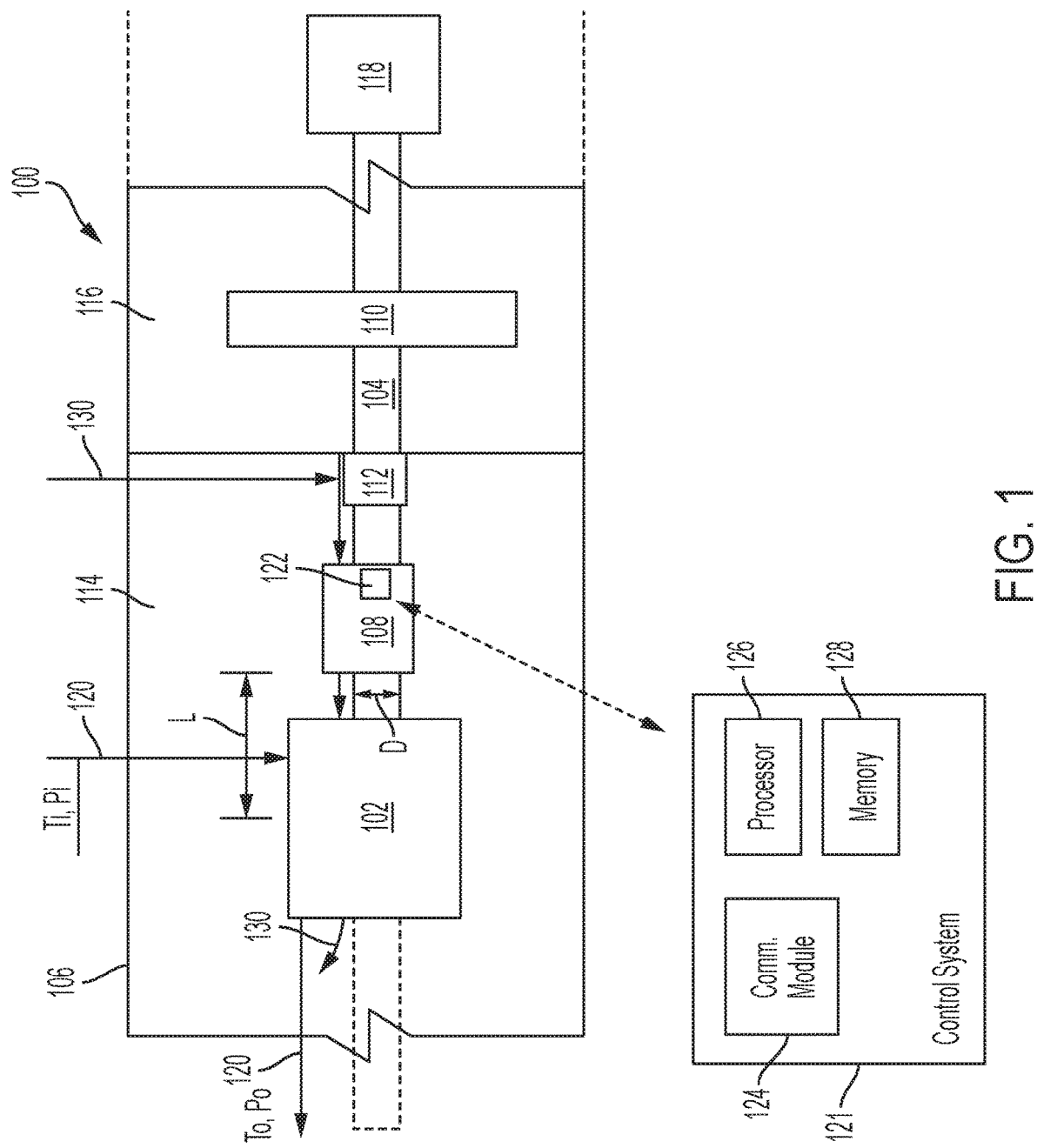
FIG. 1 illustrates an example turbomachine.

FIG. 1 illustrates an example turbomachine 100 made in accordance with the present disclosure. Turbomachine 100 includes a rotor 102 coupled to a shaft 104 disposed in a casing 106. Rotor 102 and shaft 104 are rotatably supported by a radial bearing 108 and axially supported by a thrust bearing 110. Turbomachine 100 also includes a dry gas seal 112 that is operably coupled to shaft 104 and defines a pressure boundary between a high pressure region 114 and a low pressure region 116 within casing 106. Shaft 104 is also coupled to an energy device 118 that is configured to provide or consume mechanical energy to or from the shaft. For example, energy device 118 may be a turbine, compressor, generator, or motor, depending on the particular configuration and application. As indicated by the dotted lines extending from casing 106, energy device may be located outside of the housing, or within, and it may be located in low pressure region 116 of the housing or in a separate high pressure region of the housing or a separate housing (not illustrated). For example, energy device 118 may be a second turbine or compressor and may have a similar configuration to rotor 102 and similarly located in a high pressure region of a housing that is sealed by a gas seal similar to gas seal 112. During use, rotor 102 is configured to receive a working fluid 120 having an inlet temperature, Ti, and pressure, Pi, and either extract or add energy to the working fluid and then output the working fluid at an outlet temperature, To, and outlet pressure Po.

Rotor 102 may be configured as a turbine or compressor rotor and may have any number of blades and any number of stages, and may have an axial, mixed, or radial flow configuration, depending on the specific application. In the illustrated example, rotor 102 is overhung and cantilevered from bearing 108. As indicated by the dotted line of shaft 104, in other examples, rotor 102 may not be overhung and instead the shaft may extend through the rotor and be supported by at least one an additional bearing (not shown) located on the opposite side of the rotor from bearing 108.

In the illustrated example, radial bearing 108 is disposed in high pressure region 114 and is configured and dimensioned to be exposed to working fluid 120. Bearings suitable for use as bearing 108 can include, for example, any one or more of hydrostatic fluid film, hydrodynamic fluid film, hybrid (containing elements of a hydrodynamic and hydrostatic), or a rolling element bearing. Bearing 108 can also include a suitable thrust bearing. Bearing 108 may have any lubrication system suitable for the type(s) of bearings used. In one example, bearing 108 utilizes a portion of working fluid 120, for lubrication. This has the advantage of avoiding contamination of the process fluid by a different lubricant and/or contamination of the lubricant by the process fluid. In another example, bearing 108 may be a magnetic bearing, such as an actively controlled magnetically levitated shaft bearing.

In examples where bearing 108 is a magnetic bearing, bearing control data can be used to collect rotordynamic diagnostic data for shaft 104, which can be used to monitor the health of the turbomachine 100. For example, bearing 108 can be controlled via a closed loop feedback control system 121. A shaft position sensor 122, is an integral component of a magnetic bearing, and is mounted next to the bearing and is used to measure the shaft radial position by measuring a linear distance between the sensor and an outer surface of the shaft, and transmit such data via wired and/or wireless communication with, e.g., a communication module 124 of control system 121. Bearing 108 may be an active control magnetic bearing, and an electrical current can be applied by the bearing control system 121 to control the shaft position relative the bearing. The applied electrical current is proportional to the force applied by the bearing to maintain the shaft in position. The control system 121 may be configured to monitor data from shaft position sensor 122 and the applied current or force required to maintain the shaft in position, and one or more processors 126 may be configured to calculate the forces applied to shaft 104. Processor 126 may have access to machine executable instructions for combining the calculated forces and information on the geometry of the shaft stored in, e.g., a memory 128, to predict the health of the turbomachine. Bearing 108, therefore, may be designed and configured to generate shaft rotordynamic signals for monitoring and/or controlling the rotordynamic behavior of the shaft.

Such rotordynamic diagnostic data may be particularly useful in applications where turbomachine 100 is configured for high pressure and high density working fluids, such as sCO2, due to the increased forces associated with such high density fluid that are applied to the rotor 102. Such rotordynamic data can also be particularly useful for embodiments where rotor is overhung, as in the example illustrated in FIG. 1, because a overhung configuration results in increased shaft deflections and vibration as compared to a shaft radially supported on both sides of a rotor. Such rotordynamic data can also be particularly useful when turbomachine is configured as a test platform to test rotor designs and operating conditions. For example, turbomachine 100 can be used in a laboratory setting and various designs and configurations of rotors 102 may be tested at various rotational speeds of shaft 104, inlet conditions To, Po, power generation or consumption levels of energy device 118, etc., and control system 121 in combination with bearing 108 may be used to monitor the rotordynamic performance of the turbomachine under such varied operating conditions with a particular rotor design. Such a test platform can be particularly useful for developing new turbomachinery designs for high temperature, pressure, and density working fluids, such as sCO2.

Gas seal 112 is operably coupled to shaft 104 and defines a pressure boundary between high pressure region 114 and low pressure region 116 of casing 106 to thereby provide a sealed portion of housing for containing the working fluid 120 within the high pressure region 114 and prevent or substantially prevent leakage of the working fluid from the high pressure region. In some examples, gas seal is a dry gas seal, which is a dry-running mechanical face seal having a running gap (not shown), the dry gas seal configured to receive a sealing gas as a sealing and working fluid for the gap. In some examples, the running gap of gas seal 112 includes two parallel sealing faces having a clearance on the order of microns. The sealing faces typically must be very stiff to stay flat and in some examples are made from ceramics. One rotating face may be fixed to shaft 104 and a stationary face mounted to casing 106. Seal 112 may have a relatively low maximum operating temperature to prevent thermal and/or mechanical distortions that would cause the sealing faces to go out of tolerance and cause the seal to fail. For example, gas seal 112 may have a maximum normal operating temperature in the rage of 300° F. to 500° F., and in some examples a maximum normal operating temperature of 350° F., 375° F., 400° F., 425° F., 450° F., or 475° F. By locating bearing 108 in high pressure region 114 and between rotor 102 and gas seal 112, the gas seal can be located a farther distance from the rotor than if the opposite configuration was used, i.e., locating the gas seal adjacent the rotor and between the rotor and bearing. By locating gas seal 112 farther from rotor 102, the temperatures in turbomachine 100 proximate the seal can be lower, thereby allowing for increased working fluid operating temperatures in the turbomachine while maintaining the gas seal below its maximum temperature limit.

Another benefit of locating bearing 108 in high pressure region 114 is the bearing can be located closer to rotor 102, thereby minimizing the overhang distance, L, between the bearing and rotor, which increases the overhang stiffness of the turbomachine and improves rotordynamic performance. For example, for an overhang stiffness ratio, L/D, where L is the length of shaft 104 extending between bearing 108 and the center of rotor 102, and wherein D is the outer diameter of the portion of the shaft extending between the bearing and rotor, L/D of turbomachine 100 may be between 1.5 to 3.5 and in some examples, between 2 and 3 and in some examples, between 2 and 2.5, and in some examples, approximately 2.3.

In the illustrated example, thrust bearing 110 is located in low pressure region 116 of turbomachine 100 and is not exposed to working fluid 0120. In one example, low pressure region 116 can be at atmospheric pressure. As will be appreciated, by locating thrust bearing 110 in low pressure region 116, mechanical losses are minimized that otherwise would be present if the thrust bearing was located in the working fluid. Also, in the illustrated example, as will be described more below, turbomachine 100 may be designed and configured for high pressure and density working fluids 120, such as sCO2, which result in increased axial thrust, requiring a larger thrust bearing 110 which would result in increased losses if the thrust bearing was locating in the working fluid due the required increased size of the thrust bearing. In some examples, where energy device 118 is a generator or motor and rotor 102 includes only turbine rotor(s) or compressor rotor(s), shaft 104 may experience increased axial loads due to the unbalanced nature of only a turbine or compressor coupled to the shaft, as opposed to a turbine and compressor, which also increases the required size and rating of thrust bearing 110.

As will be appreciated, turbomachine 100 may include any number of additional radial and thrust bearings in either the high or low pressure region 114, 116 of the turbomachine, such as one or more magnetic, sleeve, process lubricated, and/or foil bearings in the high pressure region, and one or more magnetic, sleeve, and/or ball bearings in the low pressure region.

In the illustrated example, turbomachine 100 also includes a coolant flow path 130 configured to provide a relatively cool fluid to cool one or more of gas seal 112, bearing 108, rotor 102, and/or other components of the turbomachine. In one example, coolant flow path 130 is configured to provide working fluid 120 at a relatively cool temperature, for example, from a low temperature location of an energy cycle the turbomachine is coupled to, such as from a location downstream of a cooler or compressor (see, e.g., FIGS. 7 and 8). In some examples, coolant flow path 130 may also provide a portion of working fluid 120 to gas seal 112 for use as a sealing gas for providing a working fluid for a running gap between the sealing faces of the seal. In some examples, as will be described in more detail below, coolant flow path may route relatively cool fluid through bearing 108 and then through gaps formed in a mechanical interface between rotor 102 and shaft 104.

Working fluid 128 may be any of a variety of working fluids known in the art, for non-limiting example, sCO2, supercritical water, a chlorofluorocarbon (CFC), a hydrochlorofluorocarbon (HCFC), a hydrofluorocarbon (HFC), a hydrocarbon (HC), a perflurocarbon (PFC), sodium, potassium, rubidium, cesium, helium, nitrogen, or any other working fluid known in the art. In some examples, turbomachine 100 may be designed and configured for high temperature and pressure operation, for example, inlet temperature, $T_i$, may be in the range of 400° C. to 900° C., and in some examples, between 500° C. and 800° C., and in some examples, between 600° C. and 700° C., and in some examples, between 650° C. and 750° C. Inlet pressure, $P_i$, may be between 2000 psi and 4500 psi, and in some examples, between 3000 psi and 4000 psi, and in some examples, between 3500 psi and 3800 psi. A density of the working fluid at the inlet to rotor 102 may also be high, for example, between 5 lb/ft^3 and 15 lb/ft^3, and in some examples, between 7 lb/ft^3 and 13 lb/ft^3, and in some examples, between 10 lb/ft^3 and 14 lb/ft^3, and in some examples, greater than 15 lb/ft^3.

FIGS. 2-6 illustrate aspects of an example turbomachine 200, which is an example instantiation of turbomachine 100. Turbomachine 200 includes a rotor 202 coupled to a shaft 204 disposed in a casing 206. Rotor 202 and shaft 204 are rotatably supported by a radial magnetic bearing 208 and axially supported by a thrust bearing 210. Turbomachine 200 also includes a dry gas seal 212 that is operably coupled to shaft 204 and defines a pressure boundary between a high pressure region 214 and a low pressure region 216 of casing 206.

In addition to radial magnetic bearing 208, turbomachine 200 also includes a radial sleeve bearing 220 located in high pressure region 214. Bearing assemblies in low pressure region 216 include thrust bearing 210, which includes a thrust collar 232 and a magnetic actuator 234, a second radial magnetic bearing 222, a second thrust bearing 223, and a backup radial ball bearing 224. Rotor 202 is overhung and coupled to a first end 228 of shaft 204 and a second end 230 of shaft 204 is configured to be coupled to an electric generator (not shown). In other examples, shaft 204 may also be coupled to one or more compressors.

In the illustrated example, rotor 202 is a turbine rotor and casing 206 defines a turbine inlet 236 and rotor 202 is configured to receive high temperature and pressure working fluid such as sCO2 at the turbine inlet and extract energy from the working fluid, resulting in the rotor driving shaft 204 about the shaft's central longitudinal axis 205 to thereby drive one or more of a compressor or generator (not shown) coupled to the shaft. In some examples, turbomachine 200 is configured to operate with a working fluid inlet temperature in the range of 400° C. to 900° C., and in some examples, between 500° C. and 800° C., and in some examples, between 600° C. and 700° C., and in some examples, between 650° C. and 750° C. In some examples, turbomachine 200 is configured to operate with a working fluid inlet pressure between 2000 psi and 4000 psi, and in some examples, between 3000 psi and 4000 psi, and in some examples, between 3500 psi and 3800 psi. In some examples, turbomachine 200 is configured for a density of the working fluid to be between 5 lb/ft^3 and 15 lb/ft^3, and in some examples, between 7 lb/ft^3 and 13 lb/ft^3, and in some examples, between 10 lb/ft^3 and 14 lb/ft^3. In some examples, turbomachine is configured and dimensioned for use in an energy cycle having a power output greater than 5 MW, and in some examples, a power output in the range of 5 MW to 30 MW, and in some examples, 10 MW to 20 MW. In some examples, turbomachine 200 is configured to generate a power output between 5 MW and 20 MW and in some examples, between 10 MW and 15 MW. In some examples, the foregoing working fluid and power output parameters can be associated with a closed loop Brayton cycle with a sCO2 working fluid, or alternate working fluids, such as one of the working fluids recited above.

Dry gas seal 212 is a dry running mechanical face seal with a relatively low maximum operating temperature as compared to the range of working fluid inlet temperatures at turbine inlet 236. Thus, as described above in connection with turbomachine 100 (FIG. 1), by locating radial magnetic bearing 208 between rotor 202 and dry gas seal 212, the dry gas seal is located farther from the hottest location of the turbomachine and in a lower temperature location where the temperature of the gas seal can be more easily maintained below its maximum operating temperature. As also described above, another benefit of locating magnetic bearing 208 closer to rotor 202 is a reduced overhang distance and a stiffer design. Radial magnetic bearing 208 may be used to obtain rotordynamic shaft data and may include a shaft position sensor (not shown) similar to sensor 122 (FIG. 1) for transmitting shaft position data for shaft control and for monitoring the rotordynamic condition of the shaft as described above. A control system (not shown), such as control system 121 (FIG. 1), may be used for such shaft control and monitoring as described above.

Figure 2:
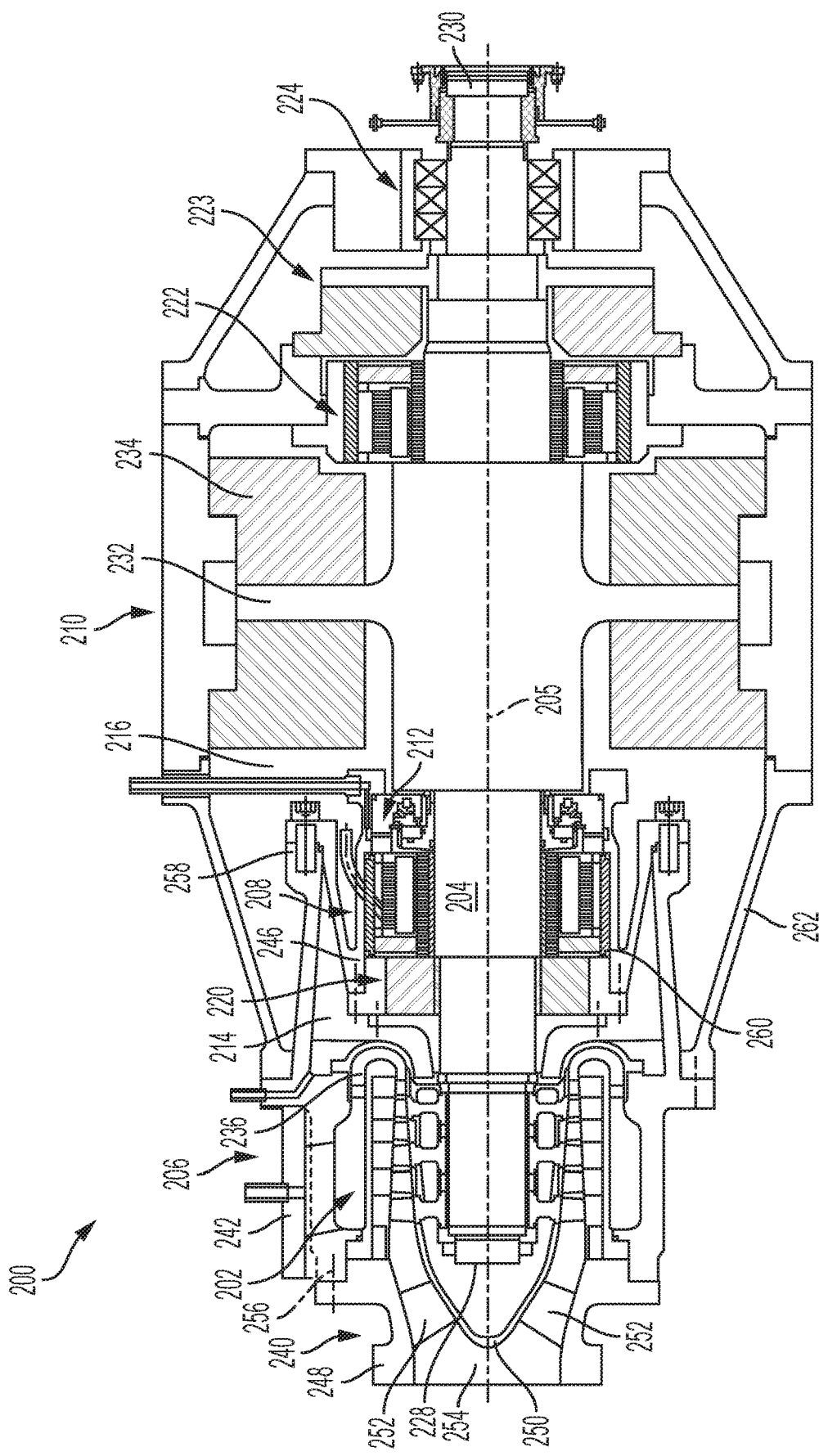
FIG. 2 illustrates another example turbomachine, which is an example instantiation of the turbomachine of FIG. 1.
Figure 3:
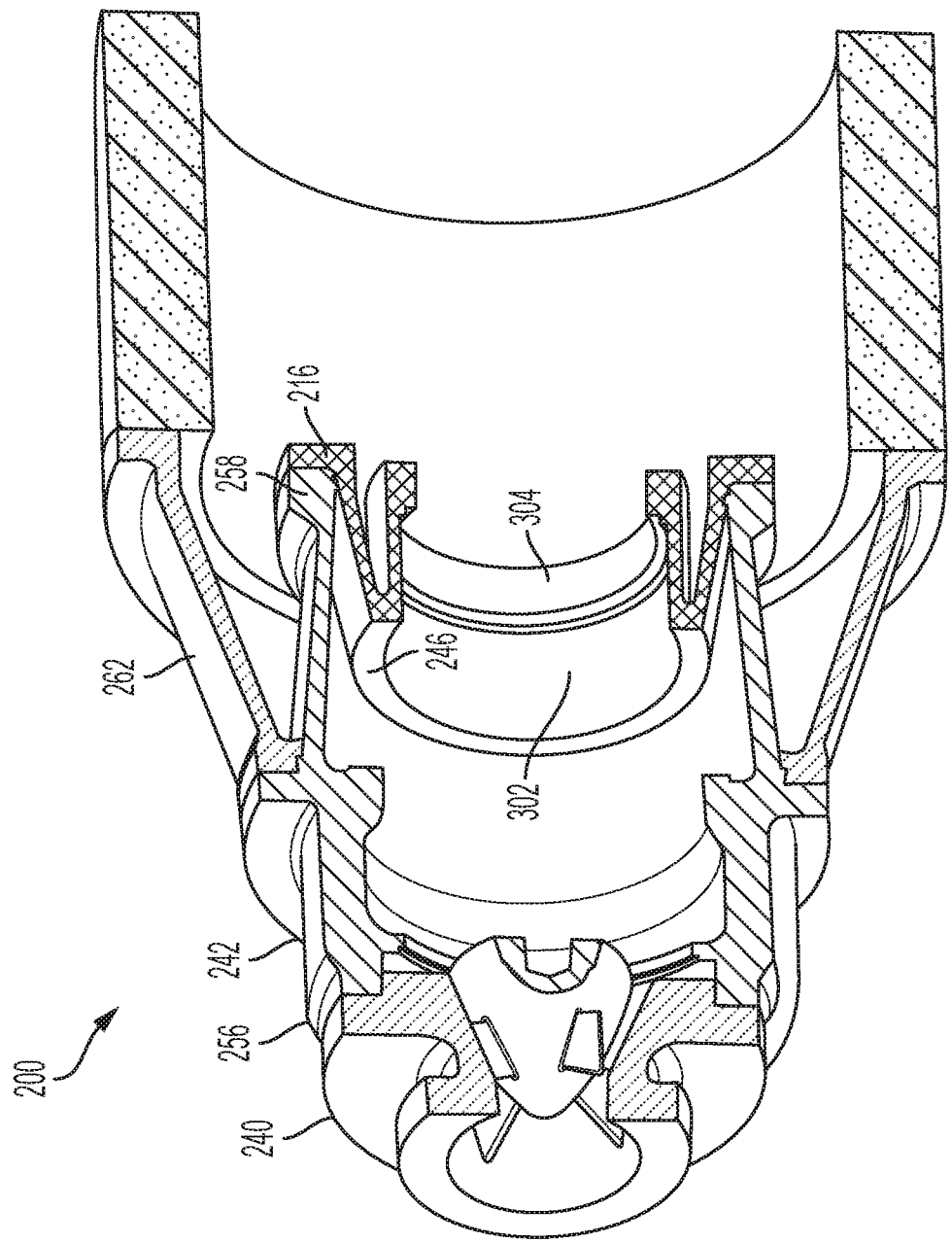
FIG. 3 illustrates certain pressure vessel components of the casing of the turbomachine of FIG. 2.

As shown in FIGS. 2 and 3, in the illustrated example, casing 206 includes a turbine exit casing 240, a rotor casing 242, and a bearing casing 246, which together form a pressure vessel that defines high pressure region 214. Turbine exit casing 240 includes a flange 248 for coupling to downstream piping (not shown). A turbine exit nose cone 250 is supported in turbine exit casing by mechanical supports 252, and the cone and exit casing define an annular turbine exit flow path 254. Rotor casing 242 is substantially cylindrical and has a first end 256 configured to couple to turbine exit casing 240 and a second end 258 configured to couple to bearing casing 246. As best seen in FIG. 3, bearing casing 246 has an inner wall 302 that is configured and dimensioned to form an interface with a complementary shaped outer surface 260 of radial magnetic bearing 208. Bearing casing 246 also includes an inner flange 304 (FIG. 3) configured to interface with a complementary shaped portion of dry gas seal 212. Casing 206 also includes an outer vent 262 that is located in ambient outside of high pressure region 214 and that includes vents (not shown) for allowing ambient air into the machine for cooling. High pressure region 214 has a relatively small volume that, in addition to rotor 202 and turbine inlet and exit flow paths, encloses a portion of shaft 204, radial sleeve bearing 220, radial magnetic bearing 208, and dry gas seal 212. Remaining portions of shaft 204 and bearing systems are located outside of high pressure region 214, in the illustrated example, located in ambient (low pressure region 216). Such a design minimizes the required size of the pressure vessel, and minimizes the rotational losses that would otherwise be present if remaining shaft and bearing systems (e.g., thrust bearing 210, radial magnetic bearing 222) were located in the high pressure region 214 and exposed to high pressure and density working fluid. Instead, thrust bearing 210 and other bearings in low pressure region 216 rotate in ambient air.

Figure 4:
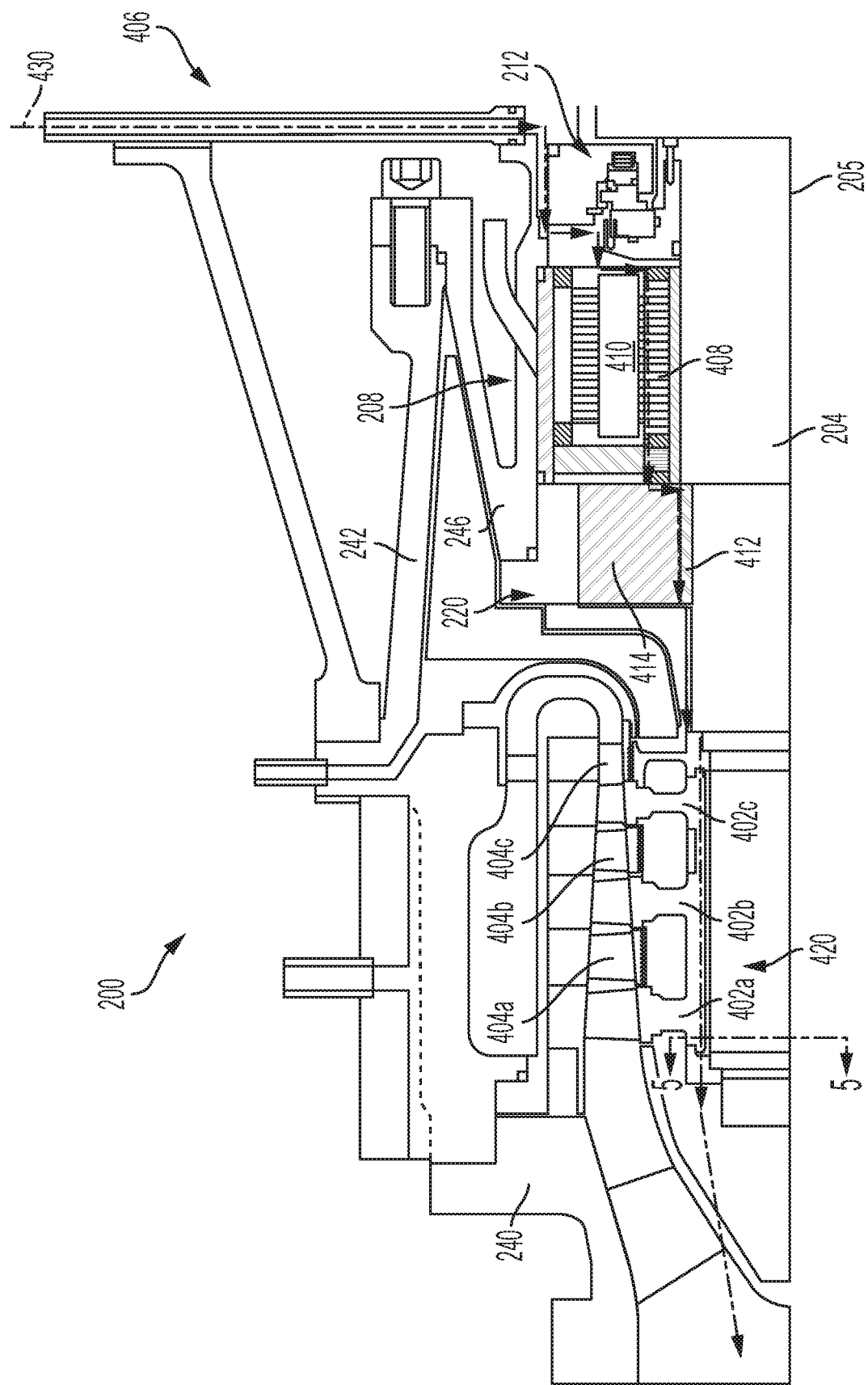
FIG. 4 illustrates a larger scale inset view of a portion of FIG. 2.

FIG. 4 is a larger scale inset view of a portion of FIG. 2. As best seen in FIG. 4, in the illustrated example, rotor 202 is an axial turbine rotor including three rotor plates 402a, 402b, 402c each coupled to shaft 204 and defining three stages. Three stator vanes 404a, 404b, 404c are coupled to casing 206 and are alternately disposed between the rotor plates 402 as shown. As will be appreciated, in other examples, turbomachines made in accordance with the present disclosure can have any other configuration known in the art, including less or additional stages.

Figure 5:
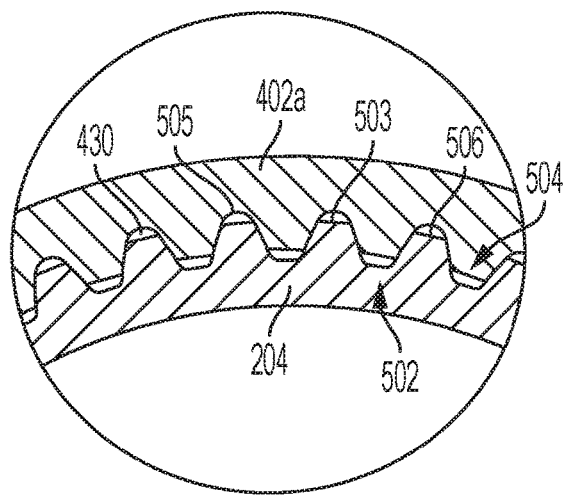
FIG. 5 is a cross sectional view of the shaft and a portion of a rotor plate of the turbomachine of FIG. 2.

Turbomachine 200 includes a coolant flow path 406 illustrated by the bold dash-dot-dash line, which is configured to provide a relatively cool fluid to cool one or more of gas seal 212, bearing 208, rotor 202, and/or other components of the turbomachine to cool the turbomachine and keep component temperatures within acceptable temperature ranges during operation. In the illustrated example, coolant flow path 406 is configured to provide working fluid 430 at a relatively cool temperature, for example, from a low temperature location of an energy cycle turbomachine 200 is coupled to, such as from a location downstream of a cooler or compressor (see, e.g., FIGS. 7 and 8). In some examples, coolant flow path 406 may also provide a portion of working fluid 430 to gas seal 212 for use as a sealing gas for providing a working fluid for a running gap between the sealing faces of the seal. As shown in FIG. 4, coolant flow path 406 routes relatively cool fluid through bearing 208 between bearing shaft sleeve 408 and bearing stator 410, through radial sleeve bearing 220 between an inner and outer sleeve 412, 414 thereof, and then through an interface 420 between rotor 102 and shaft 104. In the illustrated example, each of rotor plates 402 are non-rotatably coupled to shaft 204, for example, by a mechanical coupling, such as a splined connection. For example, as shown in FIG. 5, which is a cross section of shaft 204 and a portion of rotor plate 402a, the shaft may have elongate grooves 502 and ridges 503 along an outer surface of the shaft that are each substantially parallel to central longitudinal axis 205 (see FIG. 4), and each rotor plate 402 may have an inner surface with mating ridges 504 and grooves 505 that are configured and dimensioned to be disposed in the shaft elongate grooves and ridges. The mating ridges and grooves 502/504 and 503/505 define elongate gaps 506 therebetween. Coolant flow path 406 may route cooling fluid, such as relatively cool working fluid 430, through the elongate gaps 506, thereby routing cooling fluid along the outer surface of shaft 204 and providing a thermal barrier between the shaft and the rotor 202. Such a thermal barrier can provide the benefit of minimizing thermal soaking of the shaft, thereby preventing the gradual heating of the shaft from the rotor in a direction towards magnetic bearing 208 and dry gas seal 212. In other examples, the coolant flow path can route fluid in other sequences and locations, for example, cooling fluid may be routed directly to one or more of shaft-rotor interface 420, bearing 220, and/or bearing 208 rather than sequentially as shown, and cooling fluid may be routed through rotor 202 through a flow path other than or in addition to interface 420.

Figure 6:
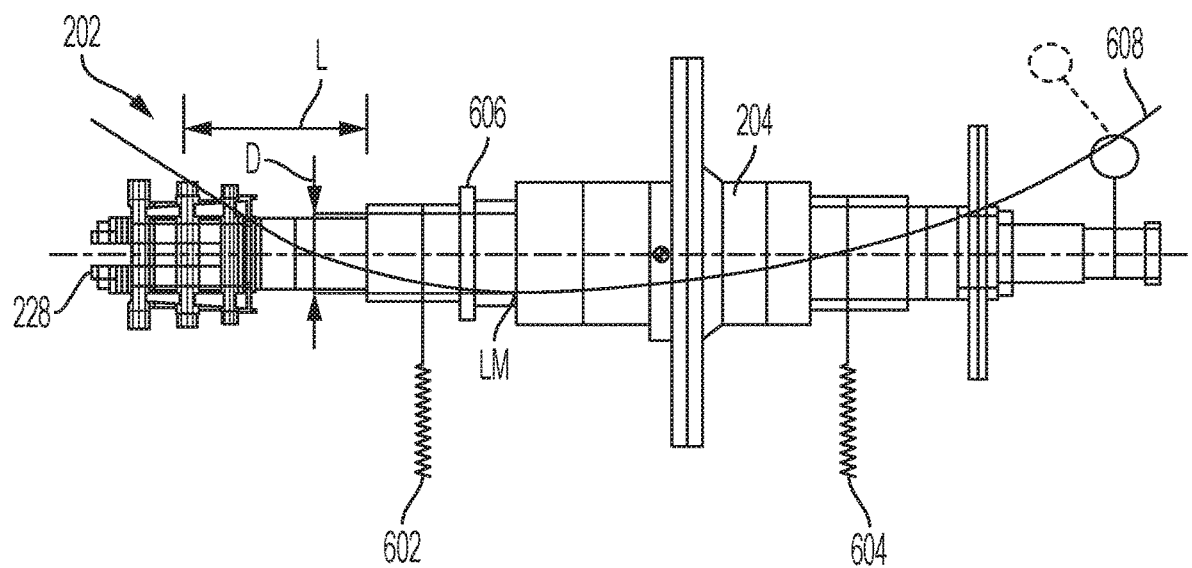
FIG. 6 illustrates the shaft of the turbomachine of FIG. 2 and a calculated shaft deflection curve.

FIG. 6 illustrates shaft 204 and rotor 202, and illustrates radial bearing symbols 602, 604, which indicate a location where an analytical model of radial magnetic bearings 208, 222 where applied in a rotor dynamic analysis of shaft 204. Shaft 204 includes a seal flange 606, which is the location where dry gas seal 212 is coupled to the shaft. FIG. 6 also conceptually shows a calculated maximum expected deflection curve 608 that illustrates the relative magnitude of deflection along the shaft when the shaft is spinning at a natural frequency associated with a first bending mode of the shaft. The magnitude of deflection curve 608 is exaggerated to visually convey the deflection characteristics of shaft 204. Curve 609 has a local minima, LM, as shown, and FIG. 6 shows that a slope of the deflection curve is less along a first portion of the curve between local minima, LM, and radial magnetic bearing 208 (location indicated by symbol 602) and that a slope of the deflection curve is greater in a second portion between radial magnetic bearing 208 and first end 228 of shaft 204. Thus, the first portion of the shaft is a vibrationally quiet region and experiences less shaft deflection and vibration than the second portion outboard of radial magnetic bearing 208. As noted above, dry gas seal 212 is located at flange 606, in the quiet region of the shaft. By locating dry gas seal 212 closer to the axial center of the shaft 204 and farther from rotor 202, the dry gas seal can be located in the vibrationally quiet region proximate the local minima of the shaft deflection curve 608 which will decrease the likelihood of failure and/or increase the duration of useful life of the dry gas seal. Radial magnetic bearing 208 can be located closer to rotor 202 in the region of the shaft 204 that experiences more shaft deflection.

Another benefit of locating bearing 208 closer to rotor 202 is the overhang distance, L, between the bearing and rotor is decreased, which increases the overhang stiffness of the turbomachine and improves rotordynamic performance. For example, for an overhang stiffness ratio, L/D, wherein L is the length of shaft 204 extending between bearing 208 and the center of rotor 202 and D is the outer diameter of the portion of the shaft extending between the bearing and the rotor. L/D of turbomachine 100 may be between 1.5 to 3.5 and in some examples, between 2 and 3 and in some examples, between 2 and 2.5, and in some examples, approximately 2.3.

Figure 8:
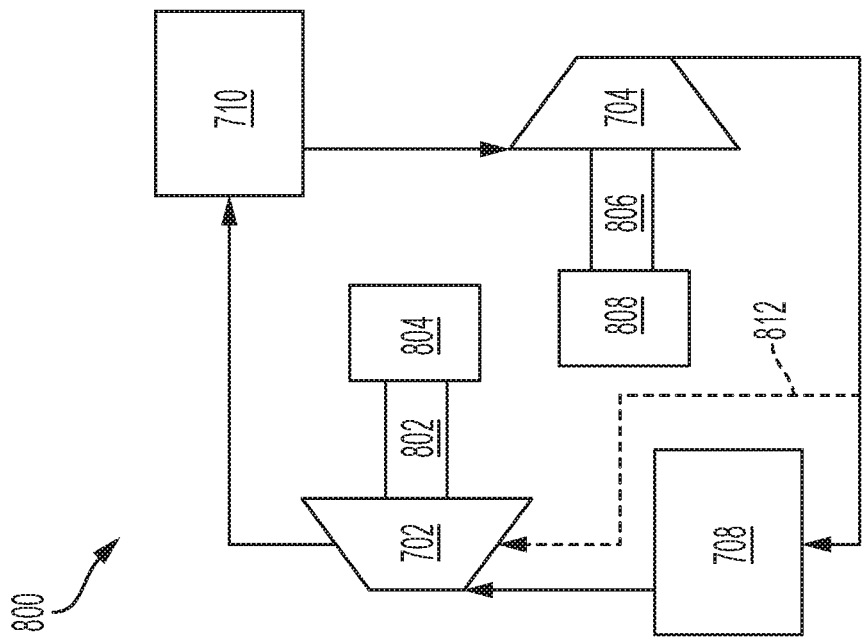
FIG. 8 illustrates another example of an energy generation system that may incorporate turbomachines made in accordance with the present disclosure.
Figure 7:
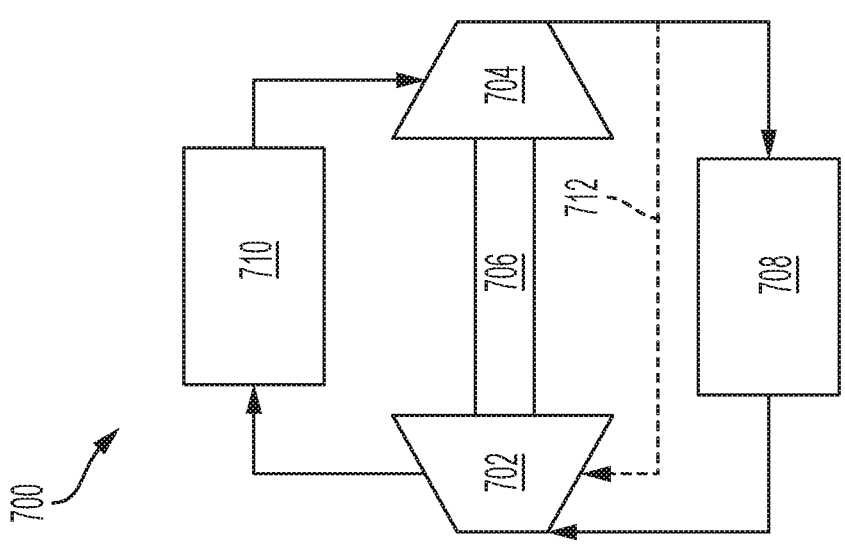
FIG. 7 illustrates an example energy generation system that may incorporate turbomachines made in accordance with the present disclosure.

FIGS. 7 and 8 illustrate two non-limiting examples of power generation systems 700, 800, that may incorporate turbomachines made in accordance with the present disclosure. System 700 is a closed-loop Brayton cycle system that includes a turbine 702 and compressor 704 on a common shaft 706 and operably coupled to a heater 708 and cooler 710, as is known in the art. System 800 is substantially the same as system 700 with same numbered components indicating the same component as system 700, the difference being turbine 702 and compressor 704 are not on a common shaft and instead the turbine is coupled by a shaft 802 to a generator 804 and the compressor is coupled by a separate shaft 806 to a motor 808. One or more of turbines 702 and/or compressor 704 in either system 700 and/or system 800 may be made in accordance with the present disclosure as described above in connection with turbomachines 100 and 200. In the illustrated examples, systems 700 and 800 optionally include cooling flow paths 712, 812 for routing relatively cool and high pressure working fluid from an outlet of compressor 704 to turbine 702 for providing cooling fluid for one or more components of the turbine as described above, and in some examples for also providing a sealing gas for one or more dry gas seals. As will be appreciated, FIGS. 7 and 8 are simplified diagrams and any of a variety of additional components known in the art may be included, such as one or more recuperators, generators, or motors, etc.

Any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
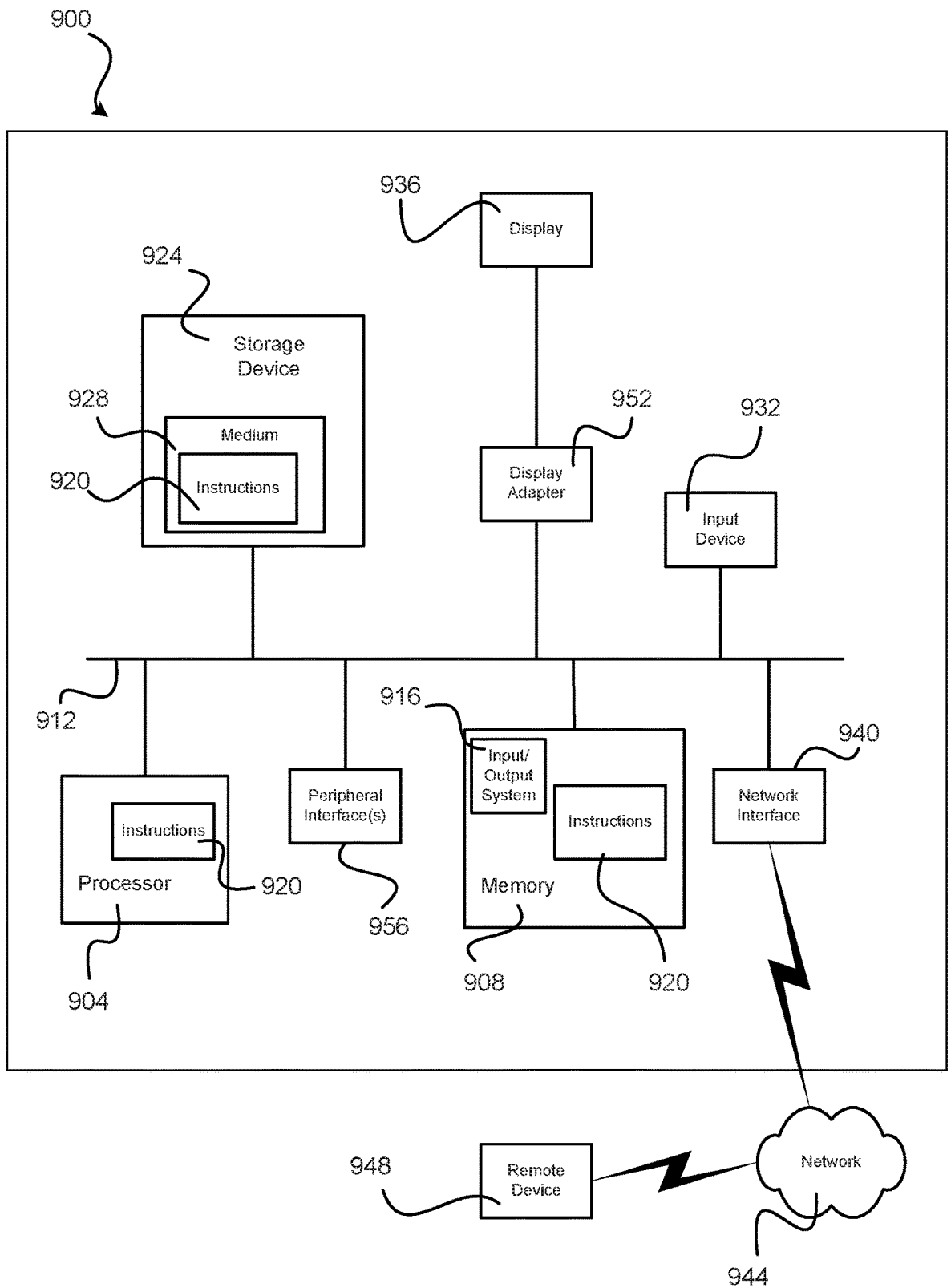
FIG. 9 is a diagrammatic representation of one embodiment of a computing device that may be used to implement one or more aspects of the present disclosure.

FIG. 9 shows a diagrammatic representation of one embodiment of a computing device in the exemplary form of a computer system 900 within which a set of instructions for causing a control system, such as the control system 121 of FIG. 1, to perform any one or more of the aspects of the present disclosure. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

What is claimed is:

1. A turbomachine, comprising:
   a shaft;
   a rotor for compressing or expanding a working fluid, a first bearing, at least one second bearing, and a dry gas seal, each of the rotor, first bearing, at least one second bearing and dry gas seal being operably coupled to the shaft;
   wherein the dry gas seal defines a pressure boundary between a high pressure region and a low pressure region of the turbomachine, the first bearing located between the rotor and the dry gas seal in the high pressure region and the at least one second bearing located in the low pressure region;
   wherein the turbomachine includes a coolant flow path configured to route a portion of the working fluid to the dry gas seal for use as at least one of a sealing gas or to cool the dry gas seal;
   wherein the rotor is coupled to the shaft at an interface, the rotor and shaft defining a plurality of elongate gaps therebetween, wherein the coolant flow path is further configured to direct the working fluid through the plurality of elongate gaps to cool the shaft and
   wherein the dry gas seal is located at a location along the coolant flow path that is upstream of the interface.

2. The turbomachine of claim 1, wherein the first bearing is a radial magnetic bearing.

3. The turbomachine of claim 2, wherein the at least one second bearing includes at least one of a thrust bearing and a radial bearing.

4. The turbomachine of claim 1, wherein the rotor is overhung and cantilevered from the first bearing.

5. The turbomachine of claim 4, wherein the rotor is a turbine rotor.

6. The turbomachine of claim 4, wherein the rotor is overhung by a distance, L, and the shaft has an outer diameter, D, further wherein L/D<4, wherein L is a length of the shaft extending between an end of the first bearing facing the rotor and an axial center of the rotor and D is an outer diameter of a portion of the shaft extending between the first bearing and the rotor.

7. The turbomachine of claim 1, wherein the rotor is a turbine rotor, further wherein the turbomachine is designed and configured for a high density working fluid having a density of at least 5 lb/ft^3 at an inlet or exit of the rotor.

8. The turbomachine of claim 1, wherein the turbomachine is designed and configured for a supercritical carbon dioxide working fluid.

9. The turbomachine of claim 1, wherein the coolant flow path extends across the first bearing to thereby cool the first bearing.

10. The turbomachine of claim 9, wherein the dry gas seal is located at a location along the coolant flow path that is upstream of the first bearing and the interface.

11. The turbomachine of claim 1, wherein the first bearing and at least one second bearing are radial bearings, the radial bearings configured and dimensioned to create a rotordynamically quiet region of the shaft between the radial bearings, wherein the dry gas seal is operably coupled to the rotordynamically quiet region of the shaft.

12. The turbomachine of claim 1, wherein the dry gas seal is a dry-running mechanical face seal having a running gap, the dry gas seal configured to receive a sealing gas as a sealing and working fluid for the running gap.

13. The turbomachine of claim 1, wherein the first bearing is an actively controlled magnetic bearing designed and configured to generate shaft rotordynamic signals for monitoring and/or controlling the rotordynamic behavior of the shaft.

14. The turbomachine of claim 1, wherein the coolant flow path is configured to route a portion of the working fluid to the dry gas seal for use as a sealing gas for the dry gas seal and to cool the dry gas seal.

* * * * *